United States Patent
Levy-Abegnoli et al.

(10) Patent No.: US 10,693,671 B2
(45) Date of Patent: Jun. 23, 2020

(54) DISTRIBUTING TRAFFIC TO MULTIPLE DESTINATIONS VIA AN ISOLATION NETWORK

(71) Applicant: Cisco Technology, Inc., San Jose, CA (US)

(72) Inventors: Eric Levy-Abegnoli, Valbonne (FR); Patrick Wetterwald, Mouans Sartoux (FR); Pascal Thubert, La Colle sur Loup (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 15/845,170

(22) Filed: Dec. 18, 2017

(65) Prior Publication Data

US 2019/0190729 A1    Jun. 20, 2019

(51) Int. Cl.
*H04L 12/18* (2006.01)
*H04L 12/761* (2013.01)
(Continued)

(52) U.S. Cl.
CPC ........ *H04L 12/185* (2013.01); *H04L 12/4641* (2013.01); *H04L 45/16* (2013.01); *H04L 45/64* (2013.01)

(58) Field of Classification Search
CPC ..... H04L 65/4076; H04L 45/04; H04L 45/16; H04L 29/06027; H04L 12/1836;
(Continued)

(56) References Cited

U.S. PATENT DOCUMENTS 9,124,536 B2 * 9/2015 DeCusatis et al.
2015/0195178 A1 * 7/2015 Bhattacharya et al.
(Continued)

FOREIGN PATENT DOCUMENTS

CN  102334111 A  1/2012
IN  201741020252  6/2017

OTHER PUBLICATIONS

Narten et al., "Problem Statement: Overlays for Network Virtualization", Internet Engineering Task Force (IETF)—Request for Comments: 7364, 23 pages, Oct. 2014, IETF Trust.
(Continued)

*Primary Examiner* — Marsha D Banks Harold
*Assistant Examiner* — Dharmesh J Patel
(74) *Attorney, Agent, or Firm* — Behmke Innovation Group LLC; James M. Behmke; Jonathon P. Western

(57) ABSTRACT

In one embodiment, a cloud-based service instructs one or more networking devices in a local area network (LAN) to form a virtual network overlay in the LAN that redirects traffic associated with a particular node in the LAN to the service. The service receives multicast or broadcast traffic sent by the particular node in the LAN and redirected to the service via the virtual network overlay. The service identifies a group of nodes in the network that are to receive the traffic sent by the particular node, based in part by profiling the traffic associated with the particular node. The service sends the traffic sent by the particular node to at least one networking device in the LAN with an indication of the identified group of nodes in the network that are to receive the traffic sent by the particular node. The at least one networking device forwards the traffic sent by the particular node to the nodes in the identified group.

18 Claims, 13 Drawing Sheets

(51) Int. Cl.
*H04L 12/715* (2013.01)
*H04L 12/46* (2006.01)

(58) Field of Classification Search
CPC . H04L 12/185; H04L 12/1886; H04L 49/201; Y02D 30/30
See application file for complete search history.

(56) References Cited

U.S. PATENT DOCUMENTS

2016/0087839 A1  3/2016  Cheng et al.
2017/0005871 A1  1/2017  Smith et al.

OTHER PUBLICATIONS

Catalyst 6500 Release 12.2SX Software Configuration Guide—MLD Sn.; https://www.cisco.com/c/en/us/td/docs/switches/lan/catalyst6500/ios/12; Jul. 11, 2016; pp. 1-11.

* cited by examiner

DISTRIBUTING TRAFFIC TO MULTIPLE DESTINATIONS VIA AN ISOLATION NETWORK

TECHNICAL FIELD

The present disclosure relates generally to computer networks, and, more particularly, to distributing traffic to multiple destinations across isolation networks.

BACKGROUND

A new form of network attack is now taking shape, whereby the Internet of Things (IoT) is used to attack the rest of the world, as opposed to the other way around. For example, a recent distributed denial of service (DDoS) attack exceeded 620 Gbps of brute force login attacks, nearly doubling that of previous peak attacks. While this was one of the largest attacks recorded to date, there are additional factors that set it apart from a "standard DDoS." Most significantly, the attack was generated by a BotNet that was comprised primarily of IoT devices. The majority of these devices were identified as security cameras and digital video records (DVRs) that were used in "Small Office/Home Office" (SoHo) setups. Of particular interest is that the attack included a substantial amount of traffic connecting directly from the BotNet to the target, rather than reflected and/or amplified traffic, as seen in recent large attacks using Network Time Protocol (NTP) and Domain Name System (DNS) vulnerabilities.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
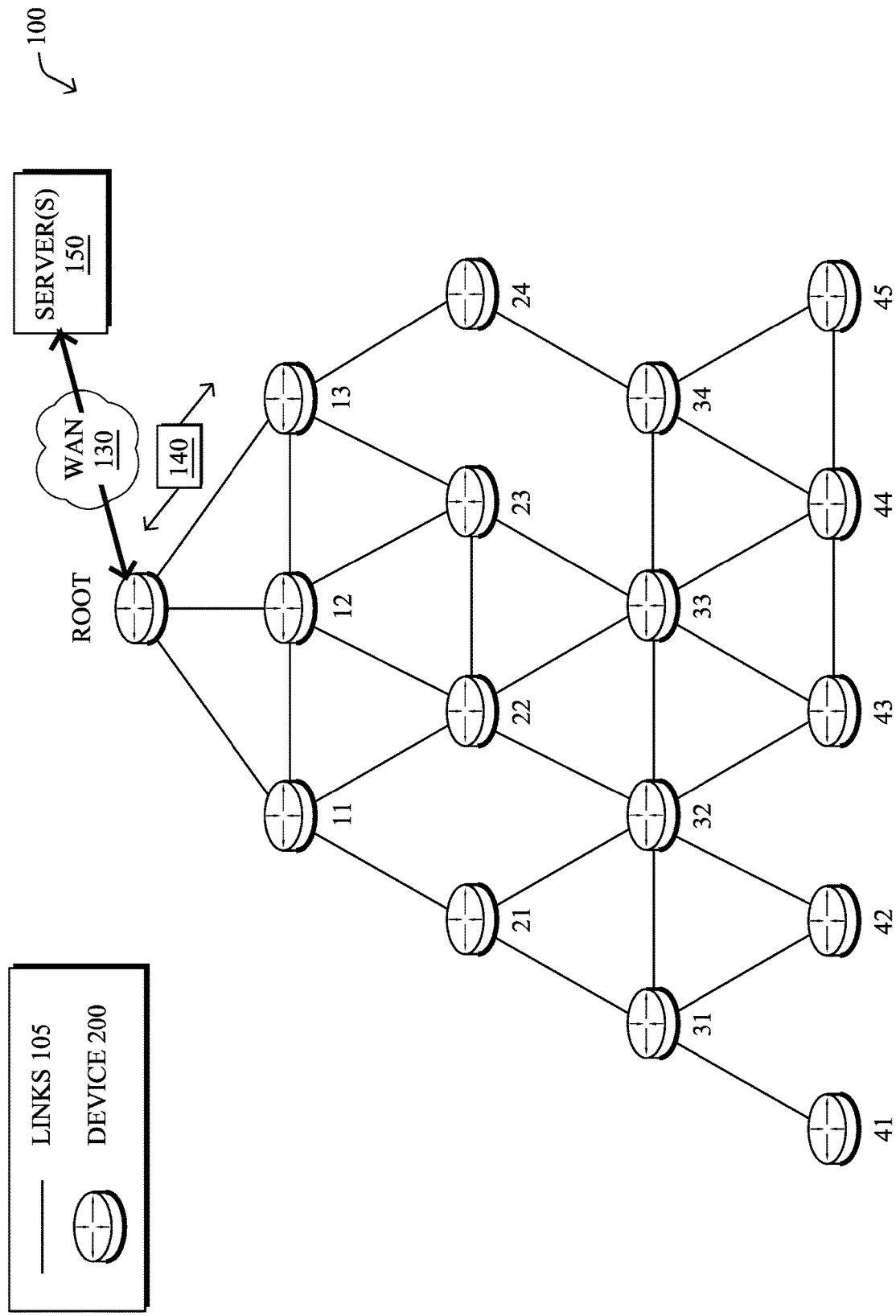
FIG. 1 illustrates an example communication network.

According to one or more embodiments of the disclosure, a cloud-based service instructs one or more networking devices in a local area network (LAN) to form a virtual network overlay in the LAN that redirects traffic associated with a particular node in the LAN to the service. The service receives multicast or broadcast traffic sent by the particular node in the LAN and redirected to the service via the virtual network overlay. The service identifies a group of nodes in the network that are to receive the traffic sent by the particular node, based in part by profiling the traffic associated with the particular node. The service sends the traffic sent by the particular node to at least one networking device in the LAN with an indication of the identified group of nodes in the network that are to receive the traffic sent by the particular node. The at least one networking device forwards the traffic sent by the particular node to the nodes in the identified group.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or powerline networks. That is, in addition to one or more sensors, each sensor device (node) in a sensor network may generally be equipped with a radio transceiver or other communication port such as powerline communication ports, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, powerline links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with WAN 130, which may house one or more other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), powerline communication protocols, or other shared-media protocols where appropriate. In this context, a protocol consists of a set of rules defining how the nodes interact with each other.

Figure 2:
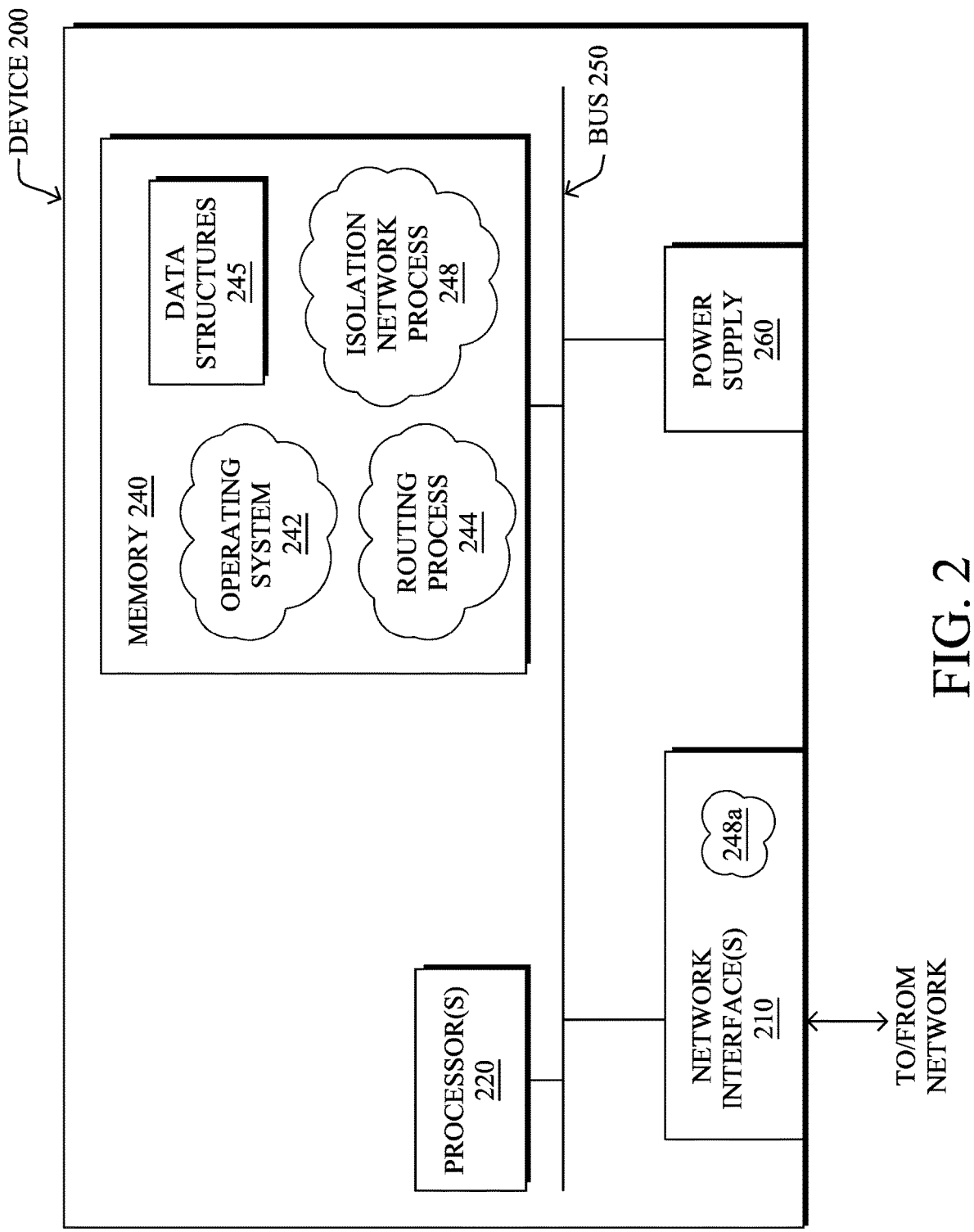
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, powerline, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for powerline communications, the network interface 210 may communicate through the power supply 260, or may be an integral component of the power supply. In some specific configurations the powerline signal may be coupled to the powerline feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244, an illustrative isolation network process 248, and an illustrative device configuring process 249, as described herein. Note that while process 248 and process 249 are shown in centralized memory 240, alternative embodiments provide for the process to be specifically operated within the network interfaces 210, such as a component of a MAC layer (e.g., process 248*a*).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As described in greater detail below, isolation network process 248 may be configured to form an "isolation network" that isolates a given network node from a networking perspective and cause the traffic of the node to be rerouted for analysis (e.g., by process 248). In some cases, isolation network process 248 may use the rerouted traffic to train a machine learning-based behavioral model of the node. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, and c such that the number of misclassified points is minimal. After this optimization/learning phase, experience prediction process 248 can use the model M to classify new data points, such as a new traffic flow associated with the node. Often, M is a statistical model, and the cost function is inversely proportional to the likelihood of M, given the input data.

In various embodiments, isolation network process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic flows that are deemed "suspicious," or "benign." On the other end of the spectrum are unsupervised techniques that do not require a training set of labels. Notably, while a supervised learning model may look for previously seen network data that has been labeled accordingly, an unsupervised model may instead look to whether there are sudden changes in the behavior of the node (e.g., the node suddenly starts attempting a large number of connections to a previously unseen destination, etc.). Semi-supervised learning models take a middle ground approach that uses a greatly reduced set of labeled training data.

Example machine learning techniques that isolation network process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

Security is one of the prime topics of concern for the IoT, and it could become a roadblock for massive adoption if it is not properly addressed. Until now, there were very few attacks which targeted the IoT space, and IoT solutions for security are in fact very minimal (for the most part they are extensions of firewalls with smart device signatures). Not only could the IoT attacks ramp up massively as IoT is being deployed, but their scale could be unprecedented due to the pervasive nature of the deployment, and their complexity could become overwhelming considering the number of protocols involved.

As noted above, a new form of IoT attack is now taking shape, whereby the IoT is used to attack the rest of the world, as opposed to the other way around. For example, a recent distributed denial of service (DDoS) attack exceeded 620 Gbps of brute force login attacks, nearly doubling that of previous peak attacks. While this was one of the largest attacks recorded to date, there are additional factors that set it apart from a "standard DDoS." Most significantly, the attack was generated by a BotNet that was comprised primarily of "Internet of Things" (IoT) devices. The majority of these devices were identified as security cameras and DVRs that were used in "Small Office/Home Office" (SoHo) setups. Of particular interest is that the attack included a substantial amount of traffic connecting directly from the BotNet to the target, rather than reflected and/or amplified traffic, as seen in recent large attacks using NTP and DNS vulnerabilities.

It is worth noting that this example attack was a DDoS attack, whereas a wide range of highly concerning attacks target data leaking or extraction, exposing private data and confidential information with possibly dramatic consequences.

The BotNet in the example above lived on the discrepancy between end-user expectations (e.g., a plug-and-play device) and the actual system they deploy (e.g., a Unix computer connected to the Internet).

The Internet is facing a widespread problem that lowers user's confidence in IoT, such as where people suddenly discover that anyone can actually see into their home through that very camera they installed for their "protection", without proper security measures and configuration taking place. Effectively, the inside of thousands of homes may be exposed over the Internet, and the next step for burglars could be to effectively use a recommendations engine to select the best house for tonight's robbery.

Notably, certain systems (e.g., a Unix system as designed for a PC or a server) comes with the capability to connect anywhere in the Internet over all sorts of protocols (SSH, HTTP, etc.) in a fashion that looks actually legit in the wire. These systems, in particular, often have the capability to open ports in the firewall (STUN, TURN, ICE . . . ), and place severe requirements on the end user, such as forcing frequent updates to cope with newly found vulnerabilities, and requiring login management to prevent unwanted parties from accessing the system.

The user expectation is that it an IoT device is plug-and-play and largely unmanaged. People do not know or care what a root user is and cannot imagine that their camera can dig gaping holes in their trusted firewall. People also will not think of or know how to upgrade their IoT systems. In fact, upgrades may not even be available from some vendors, which may either have disappeared from the market or may have rapidly lost interest in older systems in order to focus on producing new ones. Furthermore, the sheer volume of IoT devices implies a very quick and easy installation process, commonly at the expense of weaker security (e.g., shared secret, PSK). A number of examples of such trade-offs is already commercially distributed, and involves both consumer and professional grade equipment. The average IoT device often comes out-of-the-box with a well-known root password that will never be changed (such as "admin/admin"), is reachable at an easily guessable IP address (e.g., in the 192.168.1.0/24 range) and is loaded with vulnerabilities that are fully documented in the dark web and will never be fixed. Basically, many IoT devices are open doors for hackers over the Internet, and are much easier to compromise than a classical PC.

At this time, there are so many IoT devices that can be easily compromised that the attacker does not care whether a particular compromised device is detected. There needs to be no anonymity network (e.g., Tor Project), no redirection complexity, no weird packet construction that can be used to recognize a fraud. The attack comes straight from apparently a plain user, using direct connectivity such as GRE tunnels, for which defenses are not really prepared, and which may be a lot harder to sort out from real traffic.

Thus, an untrusted node may be applied in situations where a user has a limited a-priori understanding of the security posture of the device (e.g., vulnerabilities and credentials) and of its behavior, such as, e.g., opening ports for network address translation (NAT) using Universal Plug and Play (UPnP). Furthermore, a user may have no control on the device software, as originally coming out of the box and then also through firmware updates.

An attack on an IoT device may leak private information to the internet, open the private network to attackers, as well as enable an incredibly powerful BotNet. While BotNets may target the higher end of the IoT, such as TVs with hardware for video communication, video surveillance, and baby monitors, Trojan attacks may leverage any device, including bathroom scales, medical care objects, remote controls, etc. to turn the firewall and open NAT ports. Anything connected can become a backdoor to the whole private network.

Isolation Networks for Computer Devices

Figure 3A:
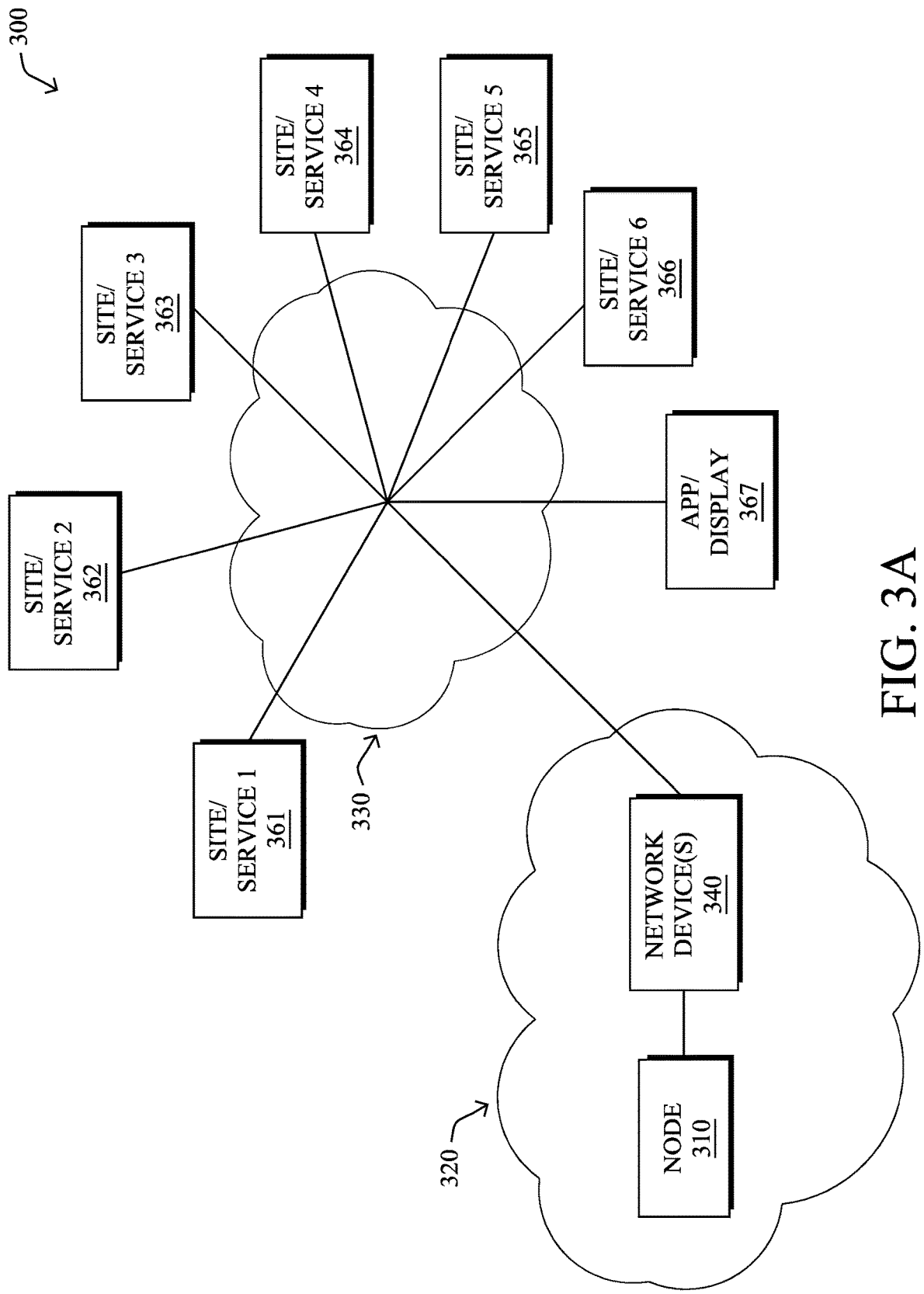
FIGS. 3A-3C illustrate an example of isolation network formation.
Figure 3B:
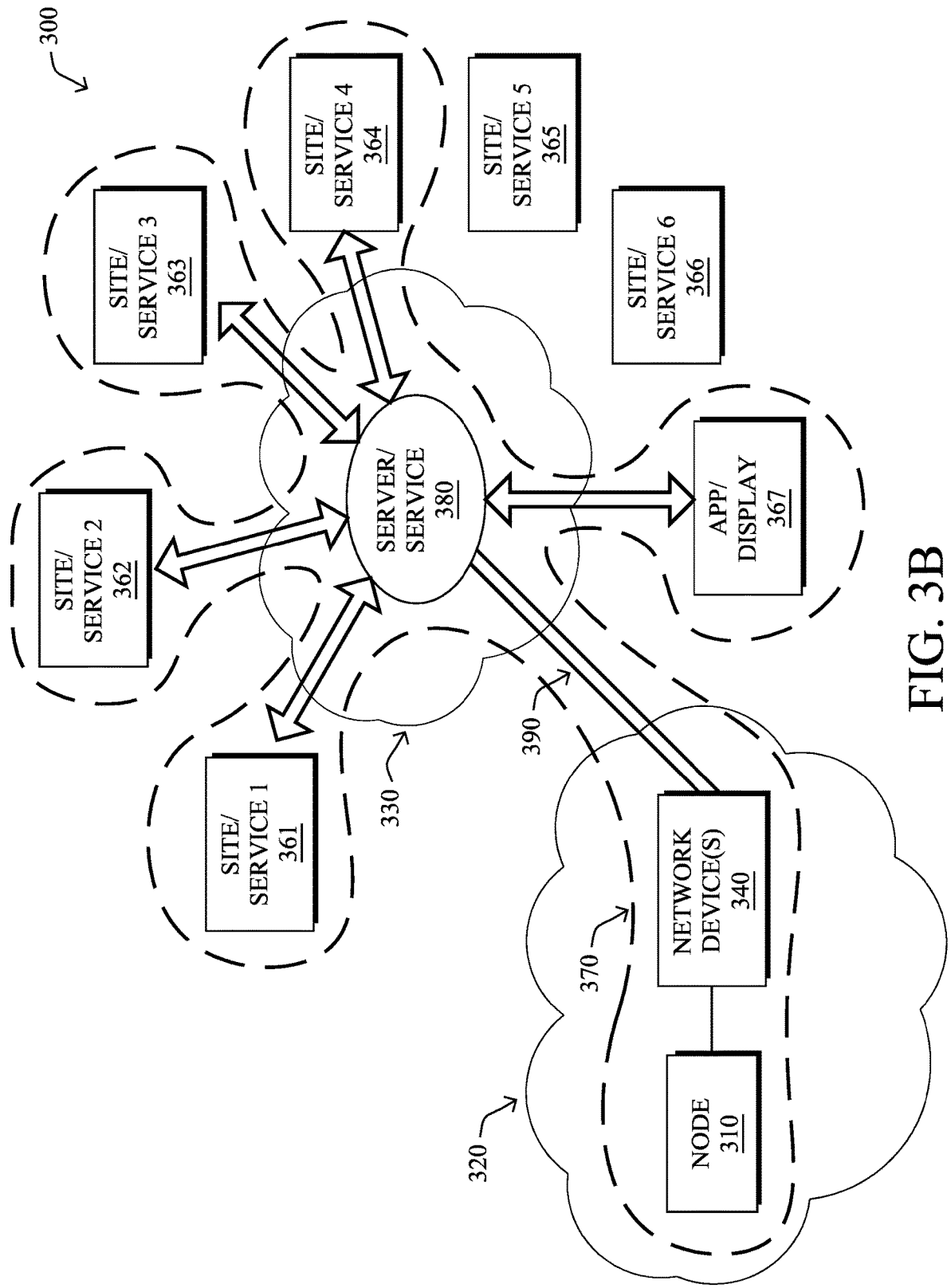
Figure 3C:
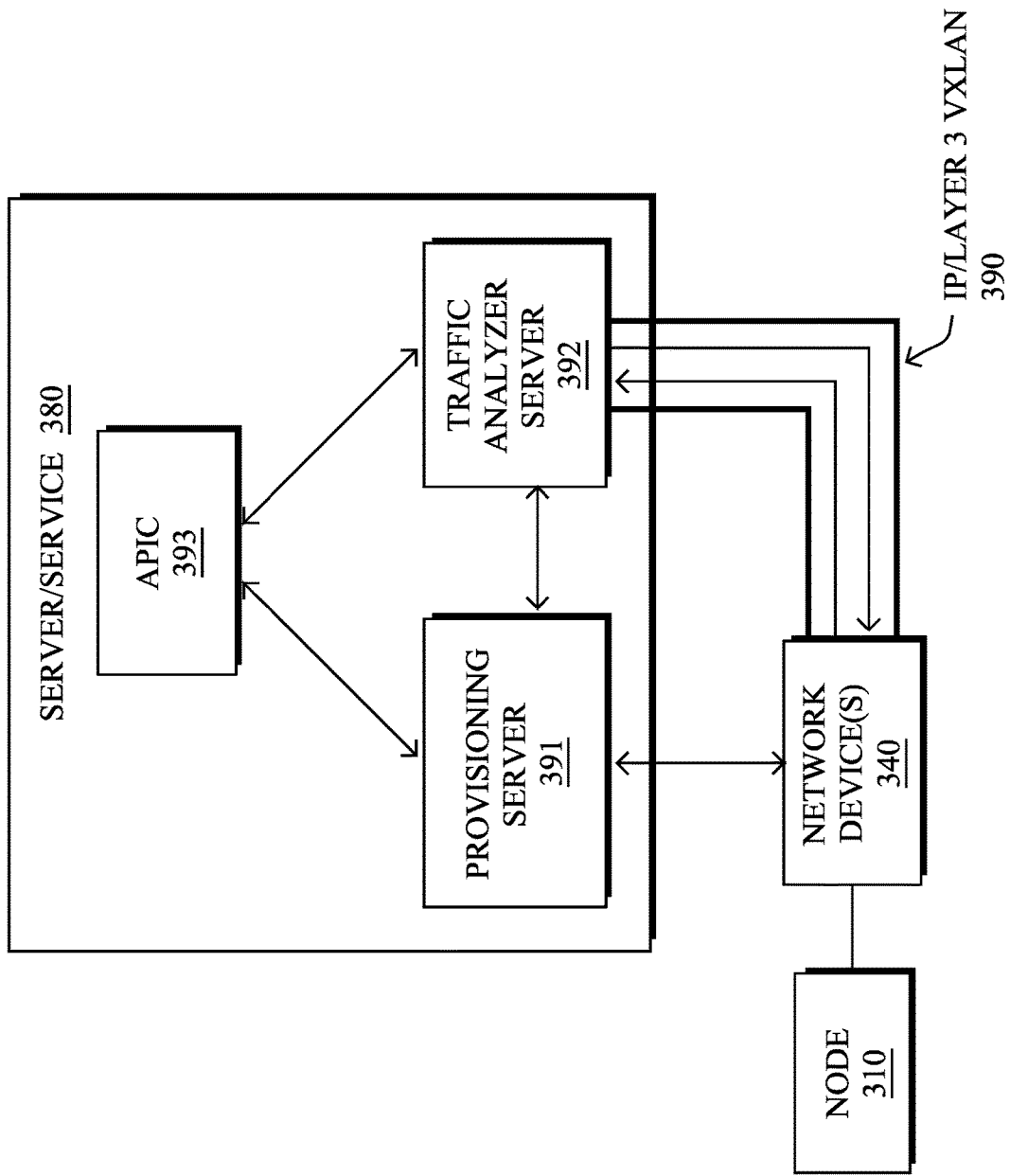

Operationally, FIGS. 3A-3C illustrate an example formation of the overall architecture discussed herein. As shown in FIG. 3A, network 300 comprises an IoT device in a network connecting to various sites, services, and/or applications. In particular, node 310 (e.g., a home or building device including a security camera, a video/audio recording device, a thermostat, a kitchen appliance, a bathroom scale, etc.) in local area network (LAN) 320 (e.g., a home or SoHo LAN or WLAN) may connect to one or more remote destinations outside of LAN 320 (e.g., site/service 1-site/service 6, 361-366, and application/display 367), such as through external network 330 (e.g. a WAN). As shown, node 310 may communicate via one or more networking devices 340 of LAN 320 (e.g., wired or wirelessly) to access the various destination 361-367 and/or other destination nodes within LAN 320. As would be appreciated, networking device(s) 340 may include, but are not limited to, (wireless) access points (APs), switches, routers, a gateway that connects LAN 320 to external network 330, combinations thereof, and the like. In general, node 310 may be able to access a wide variety of different sites and services, some of which may be either unneeded or potentially harmful or dangerous to the device as well as to other devices within its local network. As discussed above, securing the devices within LAN 320, particularly node 310, from attack may become increasingly challenging with such unchecked accesses.

FIG. 3B illustrates a specific embodiment of the present disclosure in which an isolation network is formed in order to provide improved security for node 310. As shown, a server/service 380 in external network 330 may cause the formation of a virtual network overlay that acts as an isolation network 370 for node 310. In the case of cloud-computing environments, multiple devices may be used to provide service 380. In such cases, the term "server" refers to the collective devices operating in conjunction with one another. Isolation network 370 may, in some embodiments, include node 310, the one or more networking devices 340 of LAN 320, as well as one or more destinations with which node 310 is authorized to communicate. For example, sites/services 365-366 are outside of isolation network 370 and, thus, traffic from node 310 to these sites/services would be blocked.

In more detail, in some embodiments, server/service 380 may instruct networking device(s) 340 to bridge/tunnel traffic associated with node 310 to server/service 380 for further analysis. For example, rather than sending a request from node 310 to site/service 361, the gateway of LAN 320 may redirect the traffic via a tunnel to server/service 380 for further analysis. Server 380 could also re-inject the traffic received from node 310 via the networking device(s) 340 back towards the networking device(s), to let it be bridged or routed as initially intended. When doing so, it could provide detailed instructions, embedded into the tunnel header, to instruct the networking device(s) 340 (e.g., a bridge or router), to restrict the way traffic should be bridged or routed.

As an example, assuming the networking device 340 is a switch, it may receive a multicast packet such as a Router Solicit (RS). Normally, the switch would simply broadcast to all nodes. Instead, the RS may be sent to the server 380, server 380 may decide that it should only go to the routers, re-inject the received packet to the switch, but instruct it about the 2 nodes. In turn, when the switch receives the packet, instead of broadcasting, it may only replicate the packet to the two routers.

As part of the formation of isolation network 370, server/service 380 may also generate a unique identifier for the virtual overlay of isolation network 370. For example, server/service 380 may generate and send a unique service set identifier (SSID) to networking device(s) 340, which node 310 can then use to access LAN 320 wirelessly (e.g., via a wireless AP). Similarly, for wired communication (e.g., IEEE Std. 802.15.4), the identifier may be a PAN-ID. When node 310 attempts to communicate outside of LAN 320, a communication may be received at server/service 380 via the virtual overlay of isolation network 370, and a determination may be made by the device whether the destination of the communication is one of the authorized destinations that are within the virtual overlay. The communication may then be sent to the destination if it is determined that it is, in fact, an authorized destination.

As a specific embodiment of the present disclosure, a user may wish to connect a new IoT device (e.g., node 310) to a home/SoHo network (e.g., LAN 320), in order to access various applications, sites, and/or services. Using these applications, sites, and/or services, the user may be able to, for example, visualize his/her weight loss or share videos via a smartphone where visualization of the video is possible, the smartphone being potentially on the home network (e.g., within LAN 320) or roaming on the Internet. Using the techniques herein, the user may browse a page in a bubble care management system (e.g., server/service 380) and may indicate that the IoT device is a new device. Notably, only minimal information about the device may need to be entered, such as device type, an image/picture of the device, or the manufacture's web site, to be recognized by the bubble care management system.

In response to the registration request regarding node 310, server/service 380 may instruct networking device(s) 340 to form a new virtual overlay/"bubble" that may redirect some or all of the traffic associated with node 310 to server/service 380 for further processing. In some embodiments, server/service 380 may spawn a new virtual machine (VM) or container-based application associated with node 310 to specifically handle the traffic associated with node 310. In the case of VM-based implementations, each such application may be executed within its own separately run operating system with its own set of binaries and libraries, with a hypervisor overseeing the execution of each VM. In containerized implementations, however, the operating system itself, the binaries, and/or libraries may be shared across applications as necessary, on server/service 380. According to the techniques described herein, the VM or containerized application of server/service 380 for node 310 may auto-configure an IP prefix, such as an IPv6 unique local address (ULA) or an IPv4 private address, that is forged on the fly for the virtual overlay of isolation network 370.

In some embodiments, such as for a wireless IoT node, server/service 380 may send the unique SSID (e.g., a virtual-SSID) for isolation network 370 to a user, as well as a password, if needed. Server/service 380 may also send this identifier to networking device(s) 340 of LAN 320, instructing these devices to accept a new Wi-Fi device having the established SSID/password. Note that the password may be optional since the SSID may not be exposed by the AP in its beacon, since it is not a real SSID. A similar approach may be taken in the wired case, such as by generating and sending a PAN-ID.

Thus, according to the techniques described herein, the user may enter the virtual SSID and password (if needed) into node 310 as if they were normal Wi-Fi credentials. The networking device(s) 340 (e.g., a wireless AP) may then send a beacon looking for the SSID that was programmed, per normal Wi-Fi behavior. Since this SSID has been communicated to the device AP and/or network gateway, node 310 would therefore be allowed in and associated. The authentication phase based on the SSID/password can be handled either at the device AP or the bubble care VM. For example, in a controller model, the controller may perform the L2TP to the bubble care VM. Traffic from node 310 may, in some embodiments, be encrypted with a particular session key and would not be visible from other devices/nodes which use different keys and network settings.

According to further aspects of the techniques herein, the device (e.g., the bubble care management service) may also instruct networking device(s) 340 to bridge/tunnel (e.g., using L2TP) all the datagrams associated with the SSID to the particular new bubble care VM or container running on server/service 380. In this way, communications between node 310 and server/service 380 may only occur using tunnel 390 within isolation network 370.

Networking devices 340 may bridge some or all of the traffic associated with node 310 to server/service 380, based on an established policy. In some embodiments, server/service 380 may also train a learning machine-based behavioral model for node 310 based on the received traffic associated with node 310. For example, the VM or containerized application that assesses the traffic associated with node 310 may emulate the expected networking device(s) 340 and any other servers or devices (e.g., a DNS server, etc.), from the perspective of node 310. To do so, fields, such as the prefix in a router advertisement, may be filled with the forged ULA/private addresses generated for this virtual overlay. In doing so, the machine learning-based model can "learn" the traffic behaviors associated with node 310.

Since the interaction with the network appears "normal" from the perspective of node 310, node 310 forms or obtains IP addresses and is able to communicate with the Internet via the virtual overlay of isolation network 370, but only if the destination is authorized by server/service 380. For example, note, as shown in FIG. 3B, site/service 5 (365) and site/service 6 (366) are not part of the virtual overlay of isolation network 370 and, as such, would not be accessible to node 310 (e.g., server/service 380 may drop traffic from node 310 to these destinations).

Authorized sites/services may be those that have been determined, based, for example, on the type of node 310, to be necessary (e.g., based on the information regarding node 310 in the registration request), preferable, and/or safe for the device to access. For example, remote sites/services that provide configuration management, software management (such as a vendor support site), security posture management, and/or various data publishers and subscriptions (e.g., YouTube, Google, etc.) may be authorized for inclusion in isolation network 370. Authorization may be based on either a pre-established knowledge base, which may be related to the particular brand/model/type of IoT device, or may be determined from information available related to the device. For example, a particular IoT device model may be permitted to connect to the manufacturer's site for downloading system software or to an application store for resident applications for that particular device. Authorized sites may also be determined based on target site reputation and/or heuristically.

The accessible destinations for node 310 may also be based in part on the behavioral model for node 310. For example, in cases in which the exact type of node 310 is unknown, the behavioral model of server/service 380 may be used to determine the type of node 310 and its authorized destinations. In another embodiment, the model may be used to detect and block anomalous traffic associated with node 310 (e.g., sudden and unexpected increases in traffic, etc.).

As shown in FIG. 3B, communications from node 310 are received at server/service 380 through bridge/tunnel 390 from networking device(s) 340, which helps to implement the virtual overlay of isolation network 370. In this way, node 310 and its communications are protected within isolation network 370 and are only permitted to specified authorized destinations, thereby preventing access to node 310 and protecting LAN 320 from external potential threats. Server/service 380 may either proxy the request or may extend the ULA overlay to include a particular application. As a specific example, if a smartphone is used as a display, an application available on the smartphone may terminate a L3 overlay (e.g., MIPv6 homed at the bubble care VM) that enables mobility. The VM of server/service 380 may monitor the traffic and may bridge what is deemed to be legitimate to the smartphone over the MIPv6 tunnel.

Implementation of such overlay/isolation networks (e.g., a "bubble") as described herein may be dynamic and may bootstrap, isolate, monitor, and manage computer devices, particularly IoT devices, through their lifecycles, thereby addressing one of the key inhibitors of massive IoT deployment. Additionally, isolation networks as described herein may be combined with behavioral analysis, applying the latest approaches to network isolation and mobility under the control of learning machines (e.g., code implementing machine learning algorithms such as behavioral analytics) that may be located in the cloud to benefit from cross learning (e.g., learning from datasets belonging to different networks), though some actions can be delegated locally (e.g., Home Fog).

As described herein in some embodiments, a virtual overlay network (e.g., an isolation network/bubble) may be formed that includes the few logical network devices with which an IoT device primarily needs to communicate and, further, excludes unwanted or unneeded sites/services, such as a BotNet controller (e.g., Command & Control (C2) server) that could either trigger the device if already compromised or could become a potential target that the device would attack if already programmed for attack (e.g., if the device is in the bubble). The virtual overlay described herein may protect the IoT device from remote attackers that would attempt to login to the device and compromise it, whether the attacker is far on the Internet (such as external network 330) or on the same home network (such as LAN 320). The virtual overlay network may also enable transparent connectivity to mobile personal devices such as an application/display in a smartphone.

As an intelligent protection, the isolation network (e.g., the virtual overlay network) may leverage rule-based and machine learning (ML) approaches. These techniques may be used to profile the device to determine its type, so as to derive appropriate management techniques (e.g., http html page on poor 80 in the device) and the needs for connectivity. Furthermore, the flows from/to the devices may thereby be validated and misbehaviors detected. In addition, appropriate connections to Internet services may be allowed (e.g., software upgrade, publish/subscribe servers, management, etc.) inside the virtual overlay and, in some embodiments, multiple local devices may be allowed inside the same "bubble" with the capability to either monitor or intercept the traffic at some intelligence point in the cloud or to let the traffic flow locally with no data flowing outside of the device network (e.g., a LAN or WLAN). Rule-based and ML approaches may also be used to generate and push a configuration for the device that is adapted to the device type, including dedicated home SSIDs and passwords, root passwords, management servers and passwords, URL of support servers such as software update, etc., all based on simple user input, device profiling, and potential policy rules learned for the device profile. Furthermore, a set of rules may be generated and pushed to the first hop the device connects to (e.g., a device AP, a gateway, etc.) to allow and control shortcutting of specific flows between specific devices. Web pages that have never been seen can be understood, recognizing fields and generating filled forms automatically.

In some embodiments, the techniques described herein are based on the particular mechanisms that may allow formation of a virtual overlay to isolate a device in a local network (e.g., an IoT device), to extend the virtual overlay to the cloud by creating a bubble care/isolation application instance in the cloud, and to bridge the device traffic to the isolation application instance. The techniques may leverage learning machines (e.g., combination of rules and machine learning algorithms) to emulate the interactions with routers from the bubble care/isolation application instance so the device starts normal L2/L3 activity. Said differently, the techniques described herein may use newly defined learning machine based mechanisms to isolate devices from the surrounding networks (e.g., LAN and the Internet), install the device in a virtual network (e.g., an isolation network) that is overlaid over the Internet, where the virtual network incorporates a "bubble care cloud" application that controls the connectivity of the device. Thus, in some embodiments, the techniques herein may provide full isolation of each device and the bridging to a virtual machine in the cloud on the fly, wherein the virtual machine may use artificial intelligence technology to respond to the device faking the required set of network devices.

FIG. 3C illustrates an example embodiment showing one potential implementation of server/service 380 in greater detail, according to various embodiments. As noted above, server/service 380 may comprise a single server or, alternatively as shown, several servers that operate in conjunction with one another to implement the techniques herein as part of a single remote service for the nodes in LAN 320.

In some embodiments, server/service 380 may comprise a provisioning server 391 and a traffic analyzer server 392. During operation, provisioning server 391 may instruct networking device(s) 340 to form a specific bubble/virtual overlay for one or more nodes in LAN 340 (e.g., isolation network 370). For example, provisioning server 391 may be an Identity Services Engine (ISE) from Cisco Systems, Inc., or similar server that performs the provisioning (e.g., based on the profile of node 310). In doing so, provisioning server 391 may instruct networking device(s) 340 to form a Layer 3 Virtual Extensible LAN (VXLAN) that directs traffic associated with node 310 to a traffic analysis server 392 for analysis.

During establishment of isolation network 370, provisioning server 391 may also instruct traffic analyzer server 392 to perform any number of functions on the traffic associated with node 310. For example, depending on the profile of node 310, provisioning server 391 may instruct traffic analyzer server 392 to perform firewall functions on the traffic, perform machine learning-based modeling of the traffic, or the like. In some embodiments, provisioning server 391 may instruct traffic analyzer server 392 to execute these functions within a VM or container associated with the specific isolation network 370.

In some cases, Application Policy Infrastructure Controller (APIC) 393 in server/service 390 may also provide application user group information to provisioning server 391 and/or to traffic analyzer server 392. Such information may be used by server 391-392 to help control the provisioning of isolation network 370 and/or the specific functions performed on the traffic by traffic analyzer server 392.

As noted above, an isolation network may be formed by installing a virtual network overlay, to forward traffic associated with a given node in the network to a cloud-based service. In doing so, the node is isolated from communicating with outside services, other nodes in the network, and the like, without supervision by the service. In doing so, untrusted devices such as video cameras, connected sensors and actuators, etc., can be deployed easily and operated innocuously in a private or a corporate environment, and then maintained safely and securely over time. Notably, a network administrator may not have an a-priori understanding of the security posture of the node (e.g., vulnerabilities and credentials) and of its behavior (e.g., opening ports on the NAT using UPnP, etc.). Furthermore, the administrator has no control over the software on the node, as originally coming out of the box, or through firmware updates.

More specifically, using the techniques above, an untrusted/unsecure IoT node can be isolated into a "bubble"/isolation network and policing of the traffic can occur inside the bubble, or between multiple bubbles, all within the cloud-based service. When the IoT node connects into a Layer 2 switch, an access point (AP), or a wireless controller, to name a few, the traffic sent by this object is encapsulated into a VXLAN packet, and forwarded to the cloud service for profiling, learning and/or policing. Eventually, the encapsulated frame may be re-injected to the switch for delivery to a local destination.

While isolation networks can be a powerful tool to protect against malicious nodes, one challenge that still remains is the case in which an untrusted node sends a packet to multiple destinations. For example, the node may send a broadcast packet, such as an ARP request to search for an IPv4 device's address. In another example, the node may send a link-local multicast packet targeting a local multicast group, such as a Neighbor Solicit to search for an IPv6 device's address, a Router Solicit to reach all routers on the subnet, or a more specialized destination such as "all IoT thermo-control centers).

Figure 4:
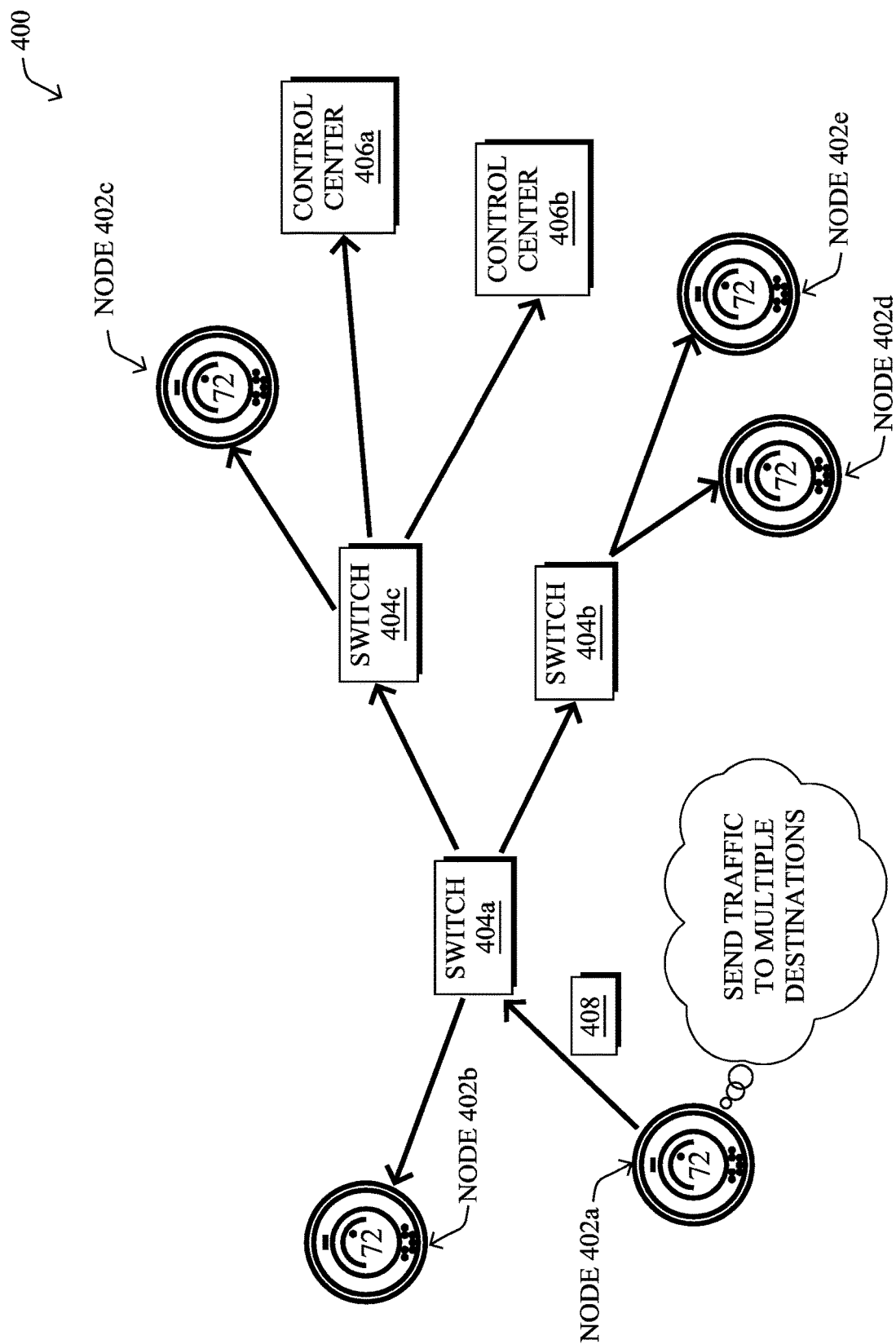
FIG. 4 illustrates an example of a node sending traffic to a plurality of destinations.

By way of illustration, consider the example 400 in FIG. 4. As shown, assume that there are a plurality of nodes 402 that are interconnected by any number of switches 404. In addition, the network may also include any number of control centers 406. For example, nodes 402a-402e shown may be thermostats located in various locations throughout the LAN, while control centers 406a-406b may be thermo-control centers.

In the case in which node 402a sends a broadcast packet 408 to its first hop, switch 404a, switch 404a would normally have no other choice than to flood packet 408 along the spanning tree to all devices in the same broadcast domain (e.g., to nodes 402b-402e, switches 404b-404c, and control centers 406a-406b). This is because switches 404 typically do not have access to the IP destination buried into the Layer-2 frame and this destination does not contains enough information for the switch to make a cheaper decision than flooding. This broadcast is very expensive in terms of resources (e.g., CPU, memory, etc.) since all devices in the broadcast domain receive the broadcast packet, which could impinge on the operation of IoT nodes that already have limited resources, as these nodes will have to spend resources to discern whether a given packet is actually for the receiving node or not.

Address resolution, whether IPv4 or IPv6, is a frequently seen example of the above situation. During address resolution, a node may look for a peer by broadcasting (e.g., as in IPv4) an address resolution request or by sending the request as a link-local multicast (e.g., as in ARP or NS, respectively). In such cases, all other nodes will receive the packet, but only one, at most, will be interested and respond.

Distributing Traffic to Multiple Destinations Via an Isolation Network

The techniques herein allow an isolation network service to profile nodes in a local network and, based on the profiling, group them by their type/nature to form broadcast groups. In some aspects, the service may program the first hop networking devices in the network with these groups. By doing so, when a multicast or broadcast packet is issued by a node, the service may identify the appropriate destination group(s) and reinject the packet to the first hop networking device(s) that have at least one known member in the destination group. The first hop devices can then replicate the packet to the interested endpoint node, thereby reducing the number of nodes that actually receive the packet.

Specifically, according to one or more embodiments of the disclosure as described in detail below, a cloud-based service instructs one or more networking devices in a local area network (LAN) to form a virtual network overlay in the LAN that redirects traffic associated with a particular node in the LAN to the service. The service receives multicast or broadcast traffic sent by the particular node in the LAN and redirected to the service via the virtual network overlay. The service identifies a group of nodes in the network that are to receive the traffic sent by the particular node, based in part by profiling the traffic associated with the particular node. The service sends the traffic sent by the particular node to at least one networking device in the LAN with an indication of the identified group of nodes in the network that are to receive the traffic sent by the particular node. The at least one networking device forwards the traffic sent by the particular node to the nodes in the identified group.

Illustratively, the techniques described herein may be performed by hardware, software, and/or firmware, such as in accordance with the isolation network process 248, which may include computer executable instructions executed by the processor 220 (or independent processor of interfaces 210) to perform functions relating to the techniques described herein, e.g., in conjunction with routing process 244.

Operationally, FIGS. 5A-5E illustrate an example 500 of distributing traffic from a node to multiple destinations via an isolation network, according to various embodiments. As shown in FIG. 5A, consider again the case in FIG. 4 whereby there are a plurality of nodes 402 interconnected by switches 404 and in communication with control centers 406. Applying the isolation network techniques herein to the network, network overlays may be installed to switches 404 to redirect traffic 506 sent by their attached nodes 402 and/or control centers 406 to their respective isolation application instances 504 (e.g., "bubbles") in cloud-based service 502.

In various embodiments, cloud-based service 502 may assess the redirected traffic 506 and determine the device and traffic profiles for the sending endpoints (e.g., nodes 402 and control centers 406). In turn, cloud-based service 502 may store the profile information in a device database. Example information that cloud-based service 502 may obtain from the redirected traffic 506 may include, but is not limited to, any or all of the following: regarding the sender:

- Device Type Information—This may indicate the specific device identifier (e.g., MAC address, manufacturer-defined ID, etc.) of the sender, the make or model of the sender, and/or a general categorization of the sender (e.g., identifying a node as smart lighting, a thermostat, etc.).
- Traffic Profile Information—This may indicate the characteristics of the traffic associated with the sender such as when the traffic is expected to be sent (e.g., a sensor reports its reading every minute, hour, day, etc.), the byte sizes of the traffic packets, the source and/or destination of the traffic (e.g., addresses, ports, etc.), the protocols used, and the like.
- Network Information—This may indicate the physical and/or network location of the sender, the time of installation of the sender, the lifetime of the sender, neighbor information for the sender, etc.

For example, by profiling the traffic 506 sent by node 402*a* and redirected to cloud-based service 502, service 502 may determine that node 402*a* is a smart thermostat that sends sensor readings to control centers 406*a* and 406*b* periodically. Table 1 below represents a possible result of such profiling:

TABLE 1

| Profile | Devices |
| --- | --- |
| Thermo Control Center | 406a, 406b |
| Thermo Sensor | 402a, 402b, 402c, 402d, 402e |
| Switch | 404a, 404b, 404c |

According to various embodiments, when cloud-based service 502 receives a redirected multicast or broadcast packet from an endpoint, it may identify which destination nodes should actually receive the packet, based on its profiling of the sender. This is assuming, of course, that even though the packet was sent via broadcast or link-local multicast, the packet is not intended for everyone, which is a very common situation in many networks. Instead of simply facilitating the multicast or broadcast of the packet back in the local network, cloud-based service 502 may make an independent assessment of which one or more destinations should actually receive the packet. In turn, cloud-based service 502 may inject the packet via one or more tunnels back to the first hop networking devices to which the destinations are connected.

Figure 5A:
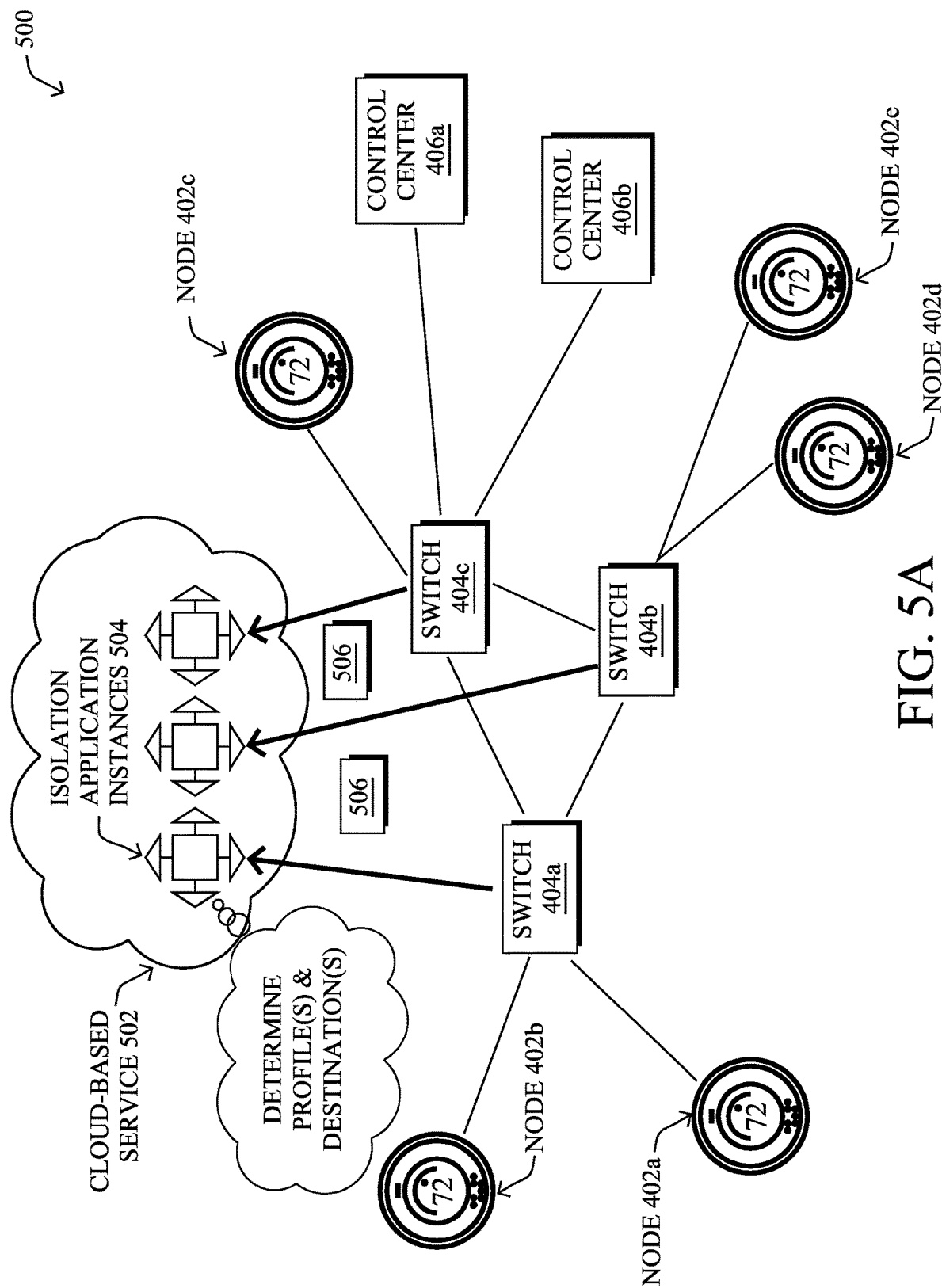
FIGS. 5A-5E illustrate an example of distributing traffic from a node to multiple destinations via an isolation network.
Figure 5B:
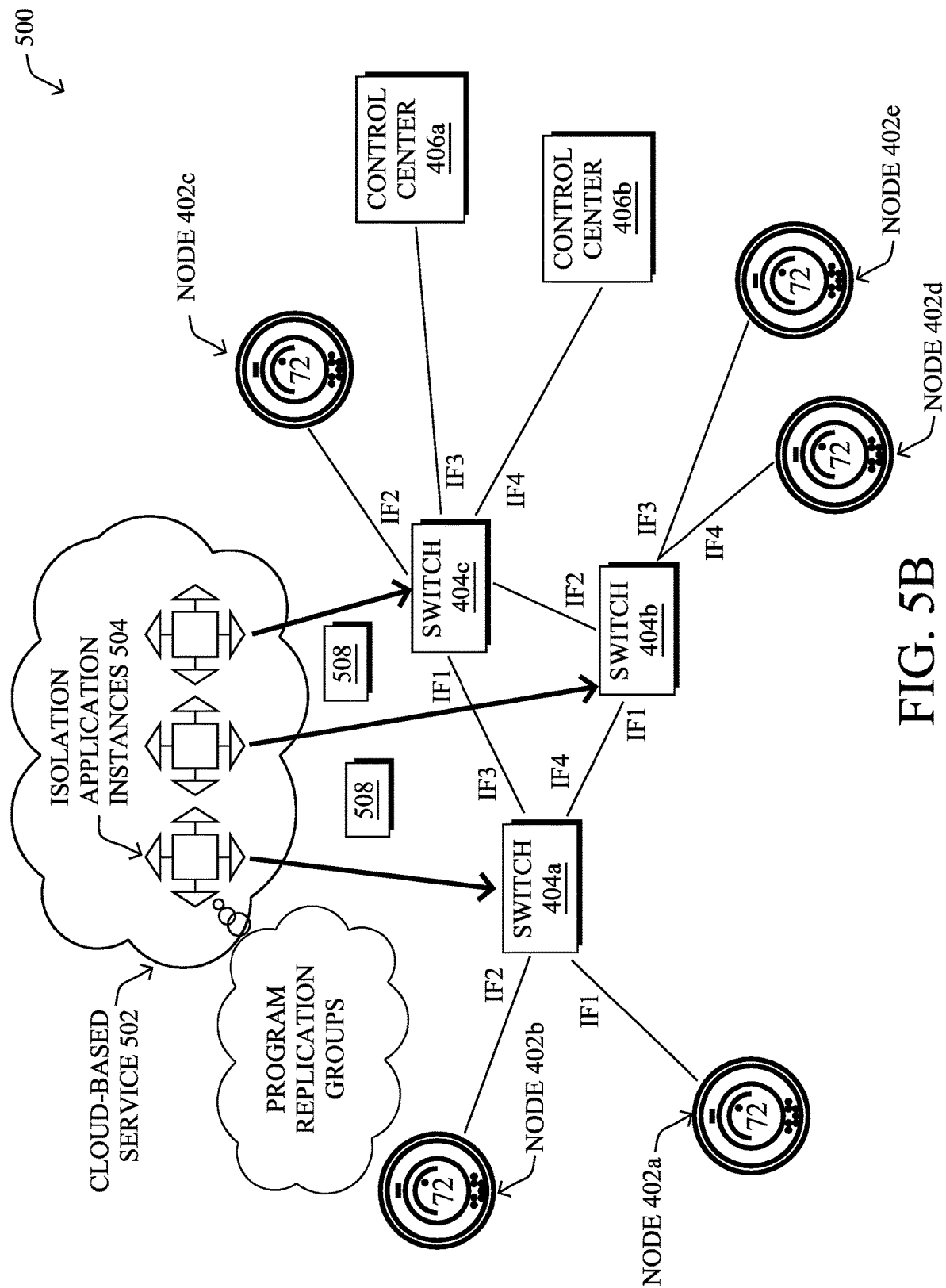
Figure 5C:
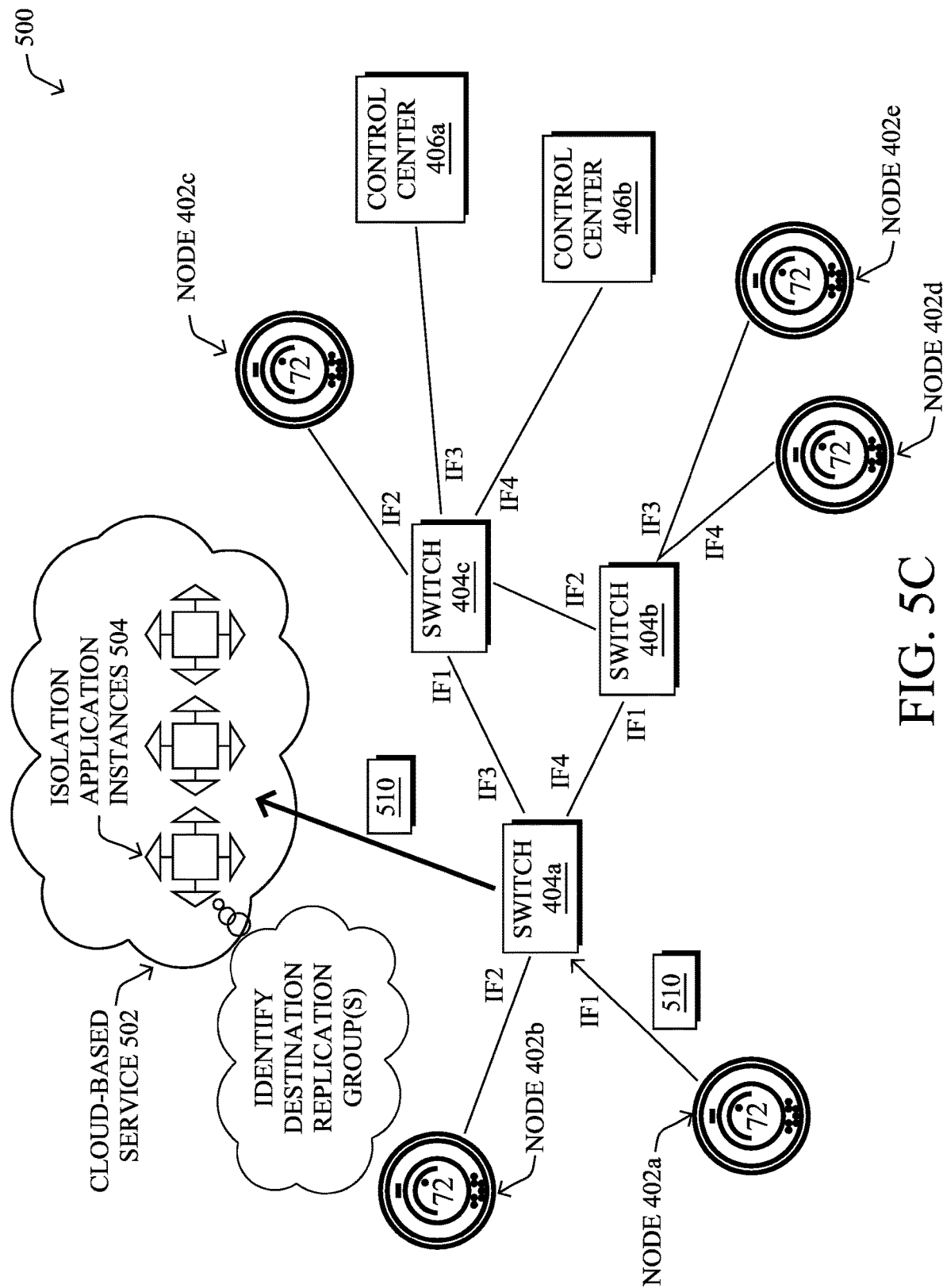
Figure 5D:
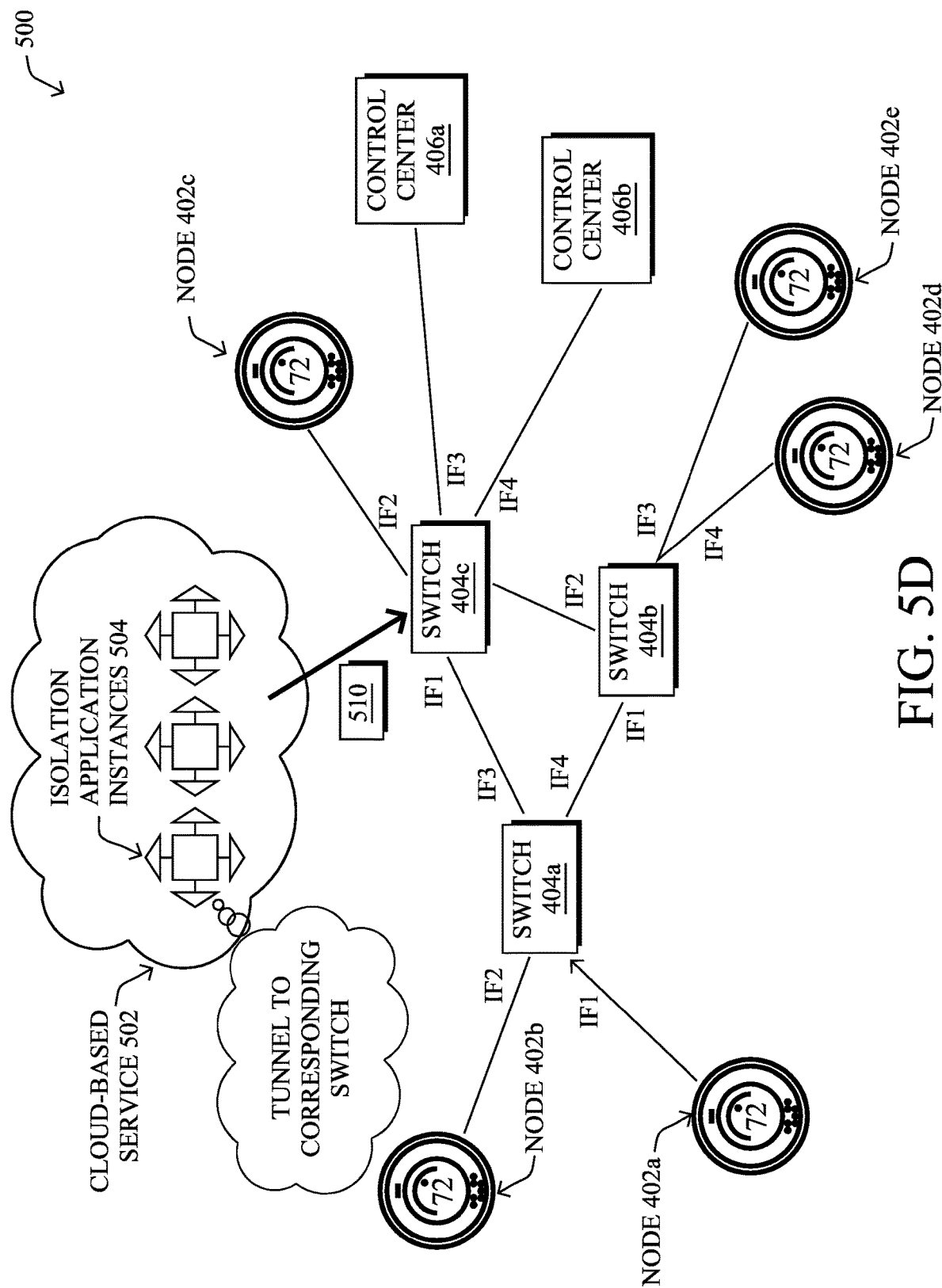

As shown in FIG. 5B, to forward the redirected packets back to their identified destinations, cloud-based service 502 may form groups of devices that have the same nature. For example, assume that nodes 402*a*-402*e* are all smart thermostats. In such a case, service 502 may group these nodes together and assign a group identifier to the group. Service 502 may also identify each device in a given group by its first hop networking device and interface to which it is attached. For example, for the devices shown, cloud-based service 502 may form the following groups:

TABLE 2

| Profile | Groups |
| --- | --- |
| All Thermo Control Center | $Group_{TC}$ = switch 404c {406a, 406b} |
| Thermo Sensor | $Group_{TS}$ = $Group_1$ + $Group_2$ + $Group_3$ |
|  | $Group_1$ = switch 404a {402a, 402b} |
|  | $Group_2$ = switch 404c {402c} |
|  | $Group_3$ = switch 404b {402d, 402e} |

Once the groups have been identified by cloud-based service 502, service 502 may use the groupings to program the first hop networking devices with "replication" groups that include the group identifier and the corresponding set of interfaces for the destinations. For example, cloud-based service 502 may send instructions 508 to switches 404*a*-404*c* with the following replication group information as follows:

TABLE 3

| Switch | Group ID | Interface(s) |
| --- | --- | --- |
| 404a | $Group_1$ | IF1, IF2 |
| 404b | $Group_2$ | IF3, IF4 |
| 404c | $Group_3$ | IF2 |
| 404c | $Group_{TC}$ | IF3, IF4 |

Once the networking devices have been programmed with the replication group information, cloud-based service 502 can use the groups for purposes of delivering packets with multiple destinations (e.g., multicast or broadcast packets). For example, consider the case in FIG. 5C whereby node 402*a* sends a multicast or broadcast packet 510 to switch 404*a*. In turn, switch 404*a* may redirect packet 510 to the isolation application instance 504 in cloud-based service 502 associated with node 402*a* via the installed tunnel overlay.

On receiving packet 510, cloud-based service 502 may assess packet 510 to identify its true destination(s). For example, cloud-based service 502 may perform a lookup in its device database, to identify the thermo-control center group as the intended destination of packet 510. In other words, even though packet 510 is a multicast or broadcast packet that may otherwise have been sent to nodes 402*b*-402*e* and to control centers 406*a*-406*b*, cloud-based service 502 may determine that only control centers 406*a*-406*b* actually need packet 510, based on their respective profiles.

After identifying the one or more destination groups for packet 510, cloud-based service 502 may tunnel packet 510 to the first hop networking device or devices that are associated with the identified group(s). For example, in the case in which packet 510 is to be delivered only to control centers 406*a*-406*b* (e.g., the "thermo-control center" group), cloud-based service 502 may tunnel packet 510 back to switch 404*c* to which control centers 406*a*-406*b* are attached. In addition, cloud-based service 502 may signal to switch 404*c* that packet 510 should be forwarded to the replication group having the identifier '$Group_{TC}$'. Such signaling may be performed either by tagging packet 510 directly or by sending a separate notification to switch 404*c* that identifies the group and packet 510.

Figure 5E:
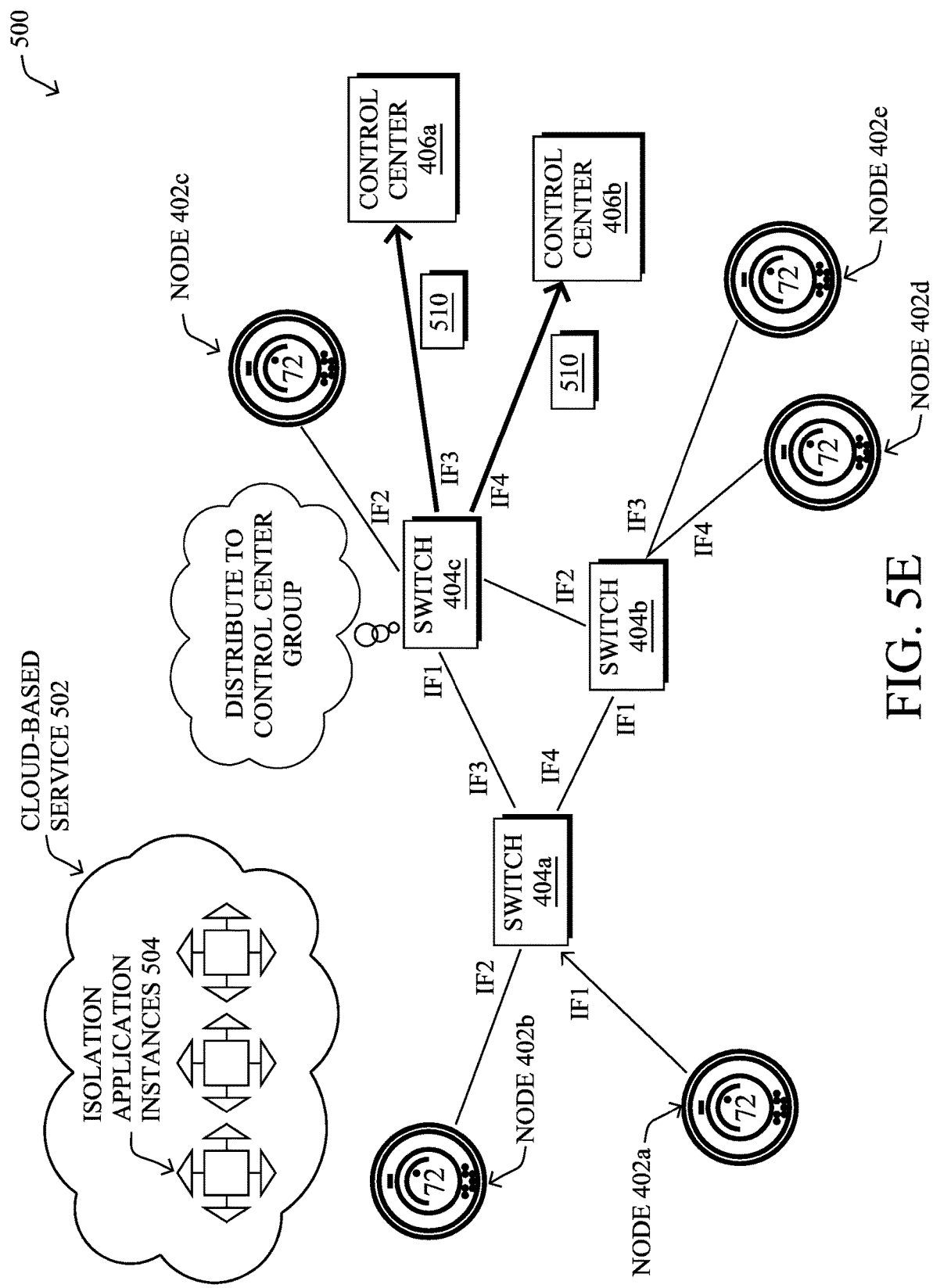

As shown in FIG. 5E, on receiving packet 510 with the replication group identifier, switch 404*c* may replicate 510 to the one or more interfaces associated with the group. For example, switch 404*c* may send one copy of packet 510 to control center 406*a* via its interface IF3 and a second copy of packet 510 to control center 406b via its interface IF4. This approach is well suited with the most advanced switching technology, which will be able to prepare a hardware replication assist for the group identifier: every time a frame should be sent to a known group identifier, the assist engine of the switch will replicate the packet to the list of ports associated with the group ID and forward. In doing so, only the packet may be sent only to a much smaller, more targeted set of destinations, than the set that would otherwise receive the multicast or broadcast packet.

Figure 6:
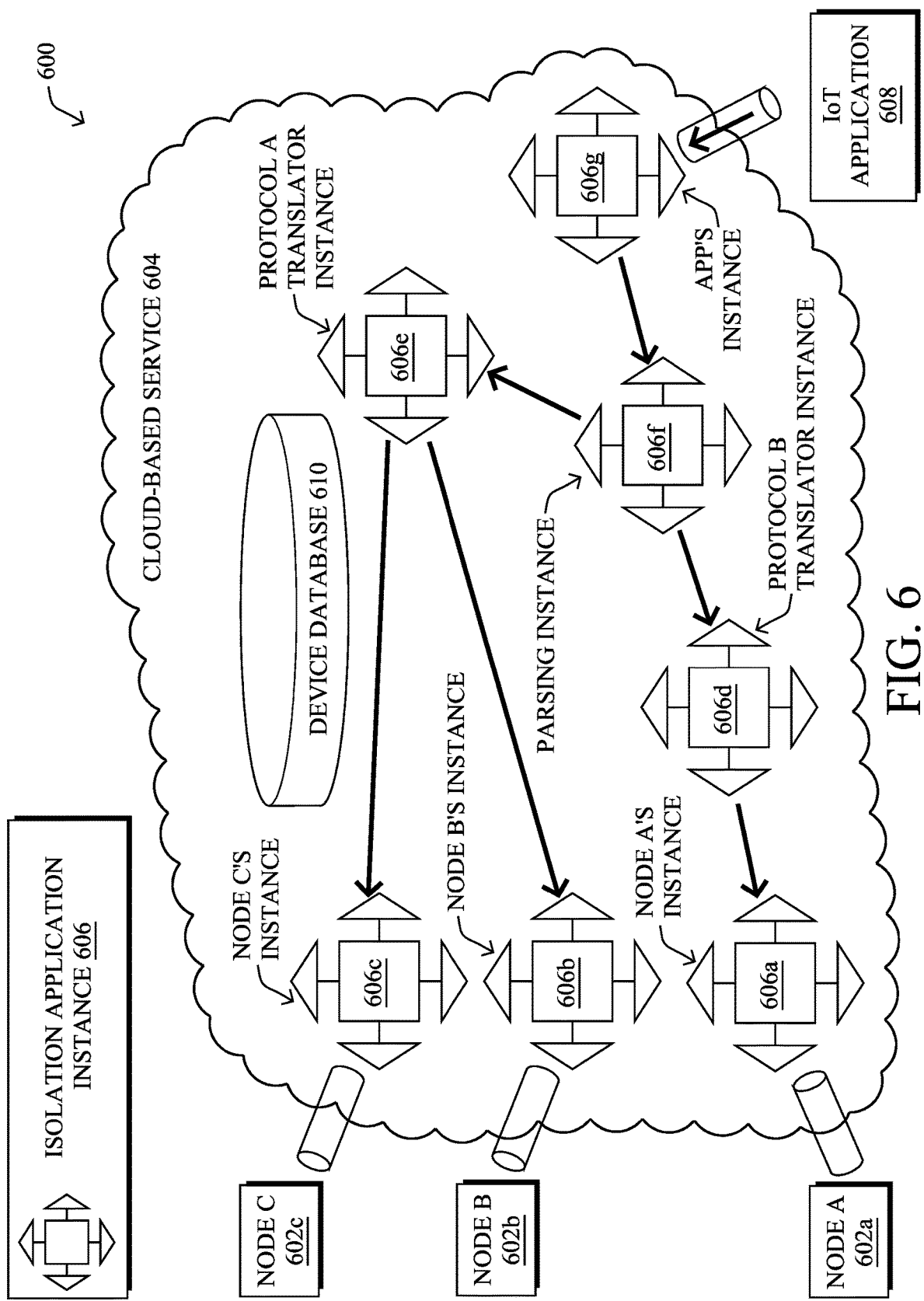
FIG. 6 illustrates an example of an application sending traffic to network nodes using a query.

Another situation in which a packet may be sent to multiple destinations is illustrated in the example 600 in FIG. 6. In addition to local nodes/devices sending traffic to multiple other nodes/devices in the local network, it may also be the case that an external application, such as a cloud-based application, may wish to send a packet to multiple nodes/devices in the local network, as well. For example, assume that nodes 602a-602c are IoT nodes/devices that communicate with a remote IoT application 608, which may be cloud-based or executed in a datacenter.

In accordance with the techniques herein, each of nodes 602a-602c may have a corresponding isolation application instance 606a-606c, respectively, in cloud-based service 504, through which their traffic may flow. Similarly, IoT application 608 may also have its own isolation application instance 606g in cloud-based service 604.

As noted above, cloud-based service 604 may profile nodes 602a-602c to determine their device types, capabilities, life cycles, reachability, etc. In turn, cloud-based service 604 may store the information about nodes 602a-602c in a device database 610 that is accessible by the isolation application instances 606 of cloud-based service 604. This database can then be used by cloud-based service 604 to distribute traffic from IoT application 608 to nodes 602a-602c via their respective bubbles/instances 606a-606c.

In various embodiments, device database 610 may be used for any or all of the following purposes:
  Associating (peering) device(s)/node(s) with applications, such as application 608.
  Forwarding packets from the application to an arbitrary sets of IoT nodes/devices on demand.
  Forwarding packets from a source IoT device to arbitrary sets of sink IoT devices on demand.

When application 608 is interested in particular content available from a node 602, it may be peered with that node in device database 610. For example, application 608 may issue a query to cloud-based service 604 for content available from nodes that have certain characteristics. In turn, instance 606g may perform a lookup of the matching nodes 602 in database 610 that can provide this data to application 608. For example, application 608 may be paired with nodes 602a-602c based on these nodes being able to send or receive certain data of interest to application 608 (e.g., certain sensor readings, etc.).

In addition, the data query from application 608 may also trigger service 604 to apply any number of micro-services to the traffic to or from nodes 602a-602c. For example, application 608 may trigger service 604 to apply security micro-services, parsing micro-services, protocol translation micro-services, or the like, to any traffic from application 608 and destined for nodes 602a-602c. To implement and apply these micro-services, each micro-service may have its own corresponding isolation application instance 606. Thus, chaining of micro-services by cloud-based service 604 may entail forming a routing path between instances 606 and tagging the traffic to follow the determined path. Such a routing path may be based, in part, on the query For example, traffic from application 608 may be passed from instance 606g to an instance 606f that parses the traffic. In turn, the traffic may be sent to a first protocol translator instance 606e and to a second protocol translator instance 606d, which translate the traffic into their respective protocols. Then, the translated traffic may be sent to the instances 606a-606c and onward to their respective nodes 602a-602c. This may be of particular use if nodes 606a and 606b-606c use different protocols for communication.

In some embodiments, application 608 can forward packets to an arbitrary set of IoT devices/nodes on demand. For example, say that application 608 needs to shut off all lights in a room, on a specified floor, or for an entire building. Each time, application 608 may issue a different query for different sets of nodes/devices in the local network. In such a case, instance 606g may perform a lookup in device database 610 for the devices that match the query and multicast the packet to the other instances that service the matching nodes (e.g., instances 606a-606c).

In further embodiments, a similar approach can be taken to forward packets from a source IoT node to an arbitrary set of sink IoT nodes on demand. Notably, a packet generated by an IoT node 602c may issue a query which can then be interpreted by instance 606c to forward the packet to the other matching nodes 602. In another embodiment, if node 602c cannot generate the query itself, instance 606c may also generate the query on behalf of node 602c. In turn, instance 606c may determine that the query should be sent to nodes 602a-602b and forward the packet to them via their respective instances 606a-606b, respectively. In some embodiments, the group addressing mechanism described previously may be used to distribute the traffic to the destination nodes.

Figure 7:
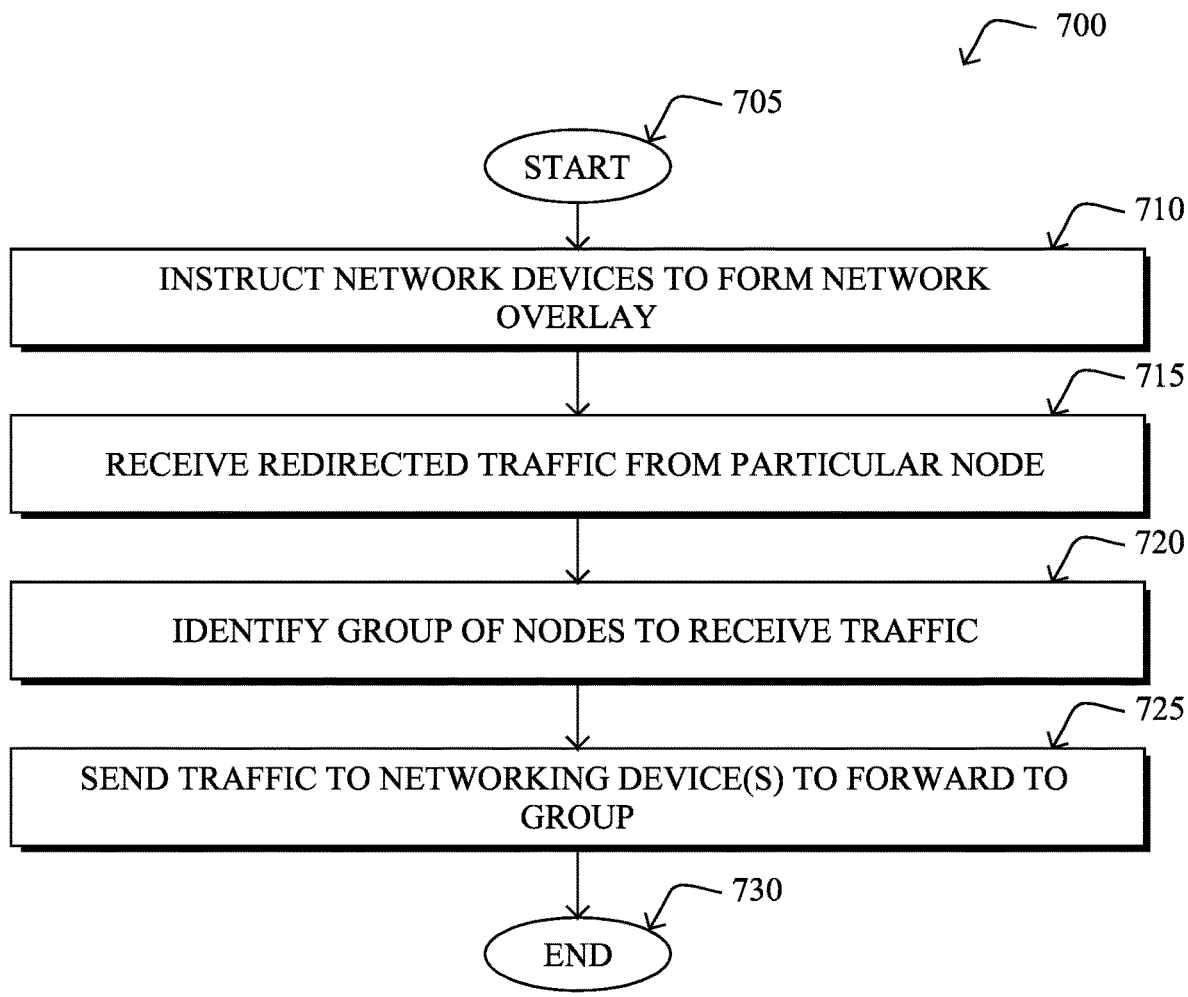
FIG. 7 illustrates an example simplified procedure for distributing traffic to multiple destinations via an isolation network.

FIG. 7 illustrates an example simplified procedure for distributing traffic to multiple destinations via an isolation network, in accordance with one or more embodiments described herein. For example, a non-generic, specifically configured device (e.g., device 200) may perform procedure 700 by executing stored instructions (e.g., process 248) to implement a service. The procedure 700 may start at step 705, and continues to step 710, where, as described in greater detail above, the service may instruct one or more networking devices in a local area network (LAN) to form a virtual network overlay in the LAN that redirects traffic associated with a particular node in the LAN to the service. For example, the service may instruct a first hop device, such as a switch, AP, or the like, to tunnel traffic associated with a sensor, actuator, control center, or other node to the service.

At step 715, as detailed above, the service may receive multicast or broadcast traffic sent by the particular node in the LAN and redirected to the service via the virtual network overlay. Such traffic may be, for example, an address resolution request sent by the node either via multicast or broadcast.

At step 720, the service may identify a group of nodes in the network that are to receive the traffic sent by the particular node, based in part by profiling the traffic associated with the particular node, as described in greater detail above. For example, the service may determine, based on the type of the node, that the traffic should be sent to a particular group of nodes of a certain type (e.g., a sensor reading should be sent to a group of controllers, etc.). Such a group may be associated with a group identifier and may, in some cases, indicate the networking devices and ports connected to the destination nodes.

At step 725, as detailed above, the service may send the traffic sent by the particular node to at least one networking device in the LAN with an indication of the identified group of nodes in the network that are to receive the traffic sent by the particular node. In turn, the at least one networking device forwards the traffic sent by the particular node to the nodes in the identified group. For example, the traffic may be tagged with a group ID that causes a receiving switch to send copies of the traffic to the nodes connected to the interfaces indicated by the group ID. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow isolation networks to be used to convey traffic from a node or application to multiple nodes at the same time. In some aspects, the techniques herein can be used to significantly limit the number of receiving devices/nodes of a multicast or broadcast packet. In further aspects, micro-services may be applied to the traffic, prior to delivery to the destinations of the packet.

While there have been shown and described illustrative embodiments that provide for distributing traffic to multiple destinations via an isolation network, it is to be understood that various other adaptations and modifications may be made within the spirit and scope of the embodiments herein. For example, while certain embodiments are described herein with respect to certain protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    instructing, by a cloud-based service executing on a device, one or more networking devices in a local area network (LAN) to form a virtual network overlay in the LAN that redirects traffic associated with a particular node in the LAN to the service;
    receiving, at the service executing on the device, multicast or broadcast traffic sent by the particular node in the LAN and redirected to the service via the virtual network overlay;
    identifying, by the service executing on the device, a group of nodes in the network that are to receive the traffic sent by the particular node, based in part by profiling the traffic associated with the particular node;
    sending, by the service executing on the device, the traffic sent by the particular node to at least one networking device in the LAN with an indication of the identified group of nodes in the network that are to receive the traffic sent by the particular node, wherein the at least one networking device forwards the traffic sent by the particular node to the nodes in the identified group;
    receiving, at the service, traffic associated with the nodes in the group that was redirected to the service via a plurality of corresponding virtual network overlays in the LAN;
    forming, by the service, the group of nodes by profiling the redirected traffic associated with the nodes; and
    installing, by the service, information regarding the group to the at least one networking device in the LAN.

2. The method as in claim 1, wherein the indication of the identified group of nodes comprises a group identifier that represents a set of interfaces of the at least one networking device in the LAN through which the at least one networking device is to forward the traffic.

3. The method as in claim 1, further comprising:
    profiling the traffic associated with the particular node to identify a device type associated with the particular node, wherein the service identifies the group of nodes in the network that are to receive the traffic sent by the particular node by matching the device type associated with the particular node to a device type associated with the group of nodes.

4. The method as in claim 1, wherein the at least one networking device comprises a first hop switch to which at least a portion of the nodes of the group are interfaced.

5. The method as in claim 1, wherein sending the traffic sent by the particular node to the at least one networking device in the LAN comprises:
    sending the traffic to the at least one networking device in the LAN via a tunnel.

6. The method as in claim 1, further comprising:
    receiving, at the service and from an application, application traffic that comprises a query;
    resolving, by the service, the query to identify the group of nodes in the LAN; and
    sending, by the service, the application traffic to the group of nodes in the LAN.

7. The method as in claim 6, wherein resolving the query to identify the group of nodes in the LAN comprises:
    accessing, by the service, a device database that stores characteristics of the nodes in the group obtained by the service by profiling traffic associated with the nodes.

8. The method as in claim 1, wherein the group of nodes comprises a different set of nodes than indicated by the multicast or broadcast.

9. An apparatus, comprising:
    one or more network interfaces to communicate with a network;
    a processor coupled to the network interfaces and configured to execute one or more processes; and
    a memory configured to store a process executable by the processor, the process when executed configured to:
        instruct one or more networking devices in a local area network (LAN) to form a virtual network overlay in the LAN that redirects traffic associated with a particular node in the LAN to the apparatus;
        receive multicast or broadcast traffic sent by the particular node in the LAN and redirected to the apparatus via the virtual network overlay;

identify a group of nodes in the network that are to receive the traffic sent by the particular node, based in part by profiling the traffic associated with the particular node;

send the traffic sent by the particular node to at least one networking device in the LAN with an indication of the identified group of nodes in the network that are to receive the traffic sent by the particular node, wherein the at least one networking device forwards the traffic sent by the particular node to the nodes in the identified group;

receiving, at the service, traffic associated with the nodes in the group that was redirected to the service via a plurality of corresponding virtual network overlays in the LAN;

forming, by the service, the group of nodes by profiling the redirected traffic associated with the nodes; and installing, by the service, information regarding the group to the at least one networking device in the LAN.

10. The apparatus as in claim 9, wherein the indication of the identified group of nodes comprises a group identifier that represents a set of interfaces of the at least one networking device in the LAN through which the at least one networking device is to forward the traffic.

11. The apparatus as in claim 9, wherein the process when executed is further configured to:

profile the traffic associated with the particular node to identify a device type associated with the particular node, wherein the apparatus identifies the group of nodes in the network that are to receive the traffic sent by the particular node by matching the device type associated with the particular node to a device type associated with the group of nodes.

12. The apparatus as in claim 9, wherein the at least one networking device comprises a first hop switch to which at least a portion of the nodes of the group are interfaced.

13. The apparatus as in claim 9, wherein the apparatus sends the traffic to the at least one networking device in the LAN by:

sending the traffic to the at least one networking device in the LAN via a tunnel.

14. The apparatus as in claim 9, wherein the process when executed is further configured to:

receive, from an application, application traffic that comprises a query;

resolve the query to identify the group of nodes in the LAN; and send the application traffic to the group of nodes in the LAN.

15. The apparatus as in claim 14, wherein the apparatus resolves the query to identify the group of nodes in the LAN by:

accessing a device database that stores characteristics of the nodes in the group obtained by the apparatus by profiling traffic associated with the nodes.

16. The apparatus as in claim 9, wherein the group of nodes comprises a different set of nodes than indicated by the multicast or broadcast.

17. A tangible, non-transitory, computer-readable medium storing program instructions that cause a service to execute a process comprising:

instructing, by the service, one or more networking devices in a local area network (LAN) to form a virtual network overlay in the LAN that redirects traffic associated with a particular node in the LAN to the service;

receiving, at the service, multicast or broadcast traffic sent by the particular node in the LAN and redirected to the service via the virtual network overlay;

identifying, by the service, a group of nodes in the network that are to receive the traffic sent by the particular node, based in part by profiling the traffic associated with the particular node; and sending, by the service, the traffic sent by the particular node to at least one networking device in the LAN with an indication of the identified group of nodes in the network that are to receive the traffic sent by the particular node, wherein the at least one networking device forwards the traffic sent by the particular node to the nodes in the identified group;

receiving, at the service, traffic associated with the nodes in the group that was redirected to the service via a plurality of corresponding virtual network overlays in the LAN;

forming, by the service, the group of nodes by profiling the redirected traffic associated with the nodes; and installing, by the service, information regarding the group to the at least one networking device in the LAN.

18. The computer-readable medium as in claim 17, wherein the indication of the identified group of nodes comprises a group identifier that represents a set of interfaces of the at least one networking device in the LAN through which the at least one networking device is to forward the traffic.

* * * * *